Figure 1:
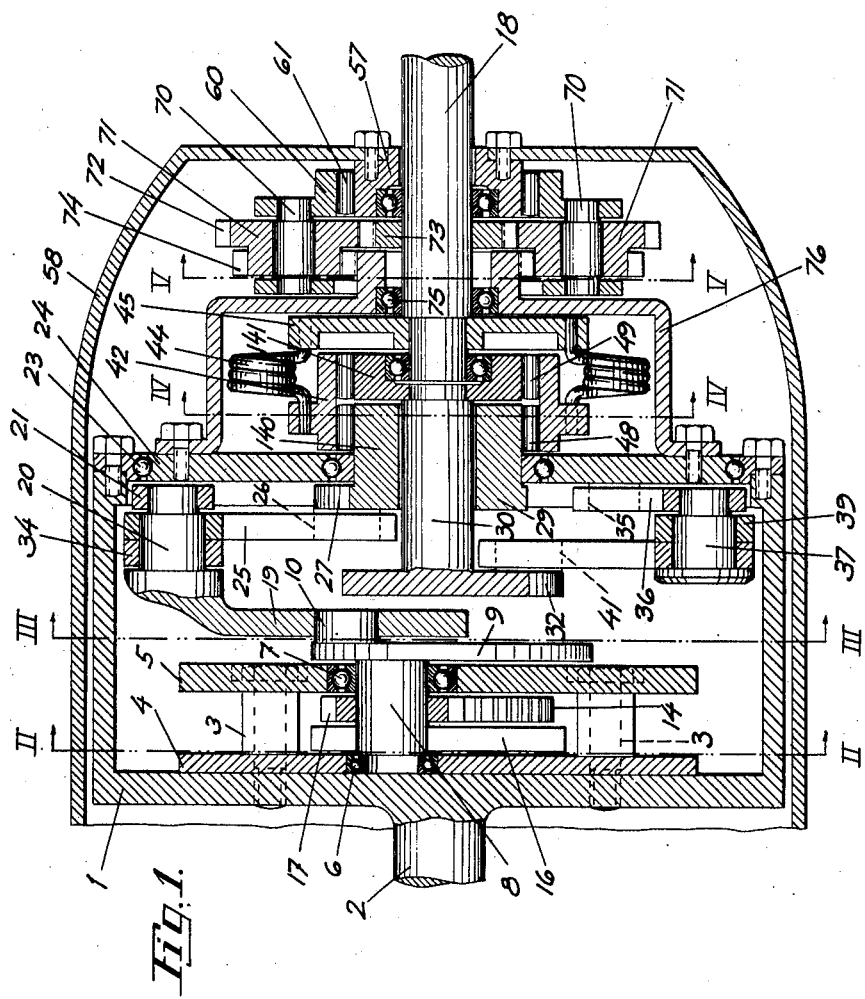

Jan. 20, 1942.  E. W. HERMANSSON  2,270,797
VARIABLE-SPEED RATCHET GEARING
Filed Dec. 29, 1939  3 Sheets-Sheet 1

INVENTOR.
Emil W. Hermansson
BY
William C. Linton.
ATTORNEY.

Jan. 20, 1942.  E. W. HERMANSSON  2,270,797
VARIABLE-SPEED RATCHET GEARING
Filed Dec. 29, 1939   3 Sheets-Sheet 2
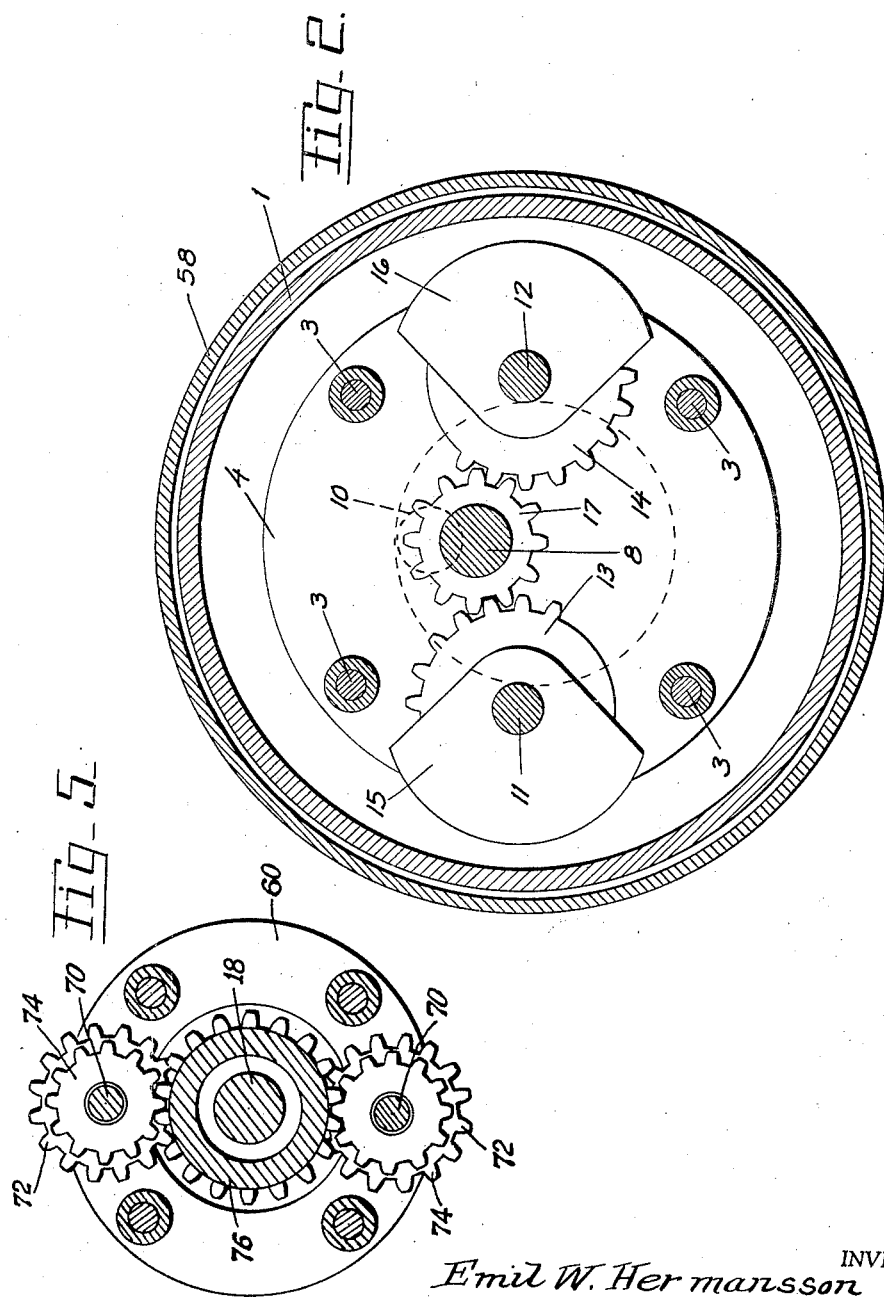
INVENTOR.
Emil W. Hermansson
BY
William C. Linton.
ATTORNEY.

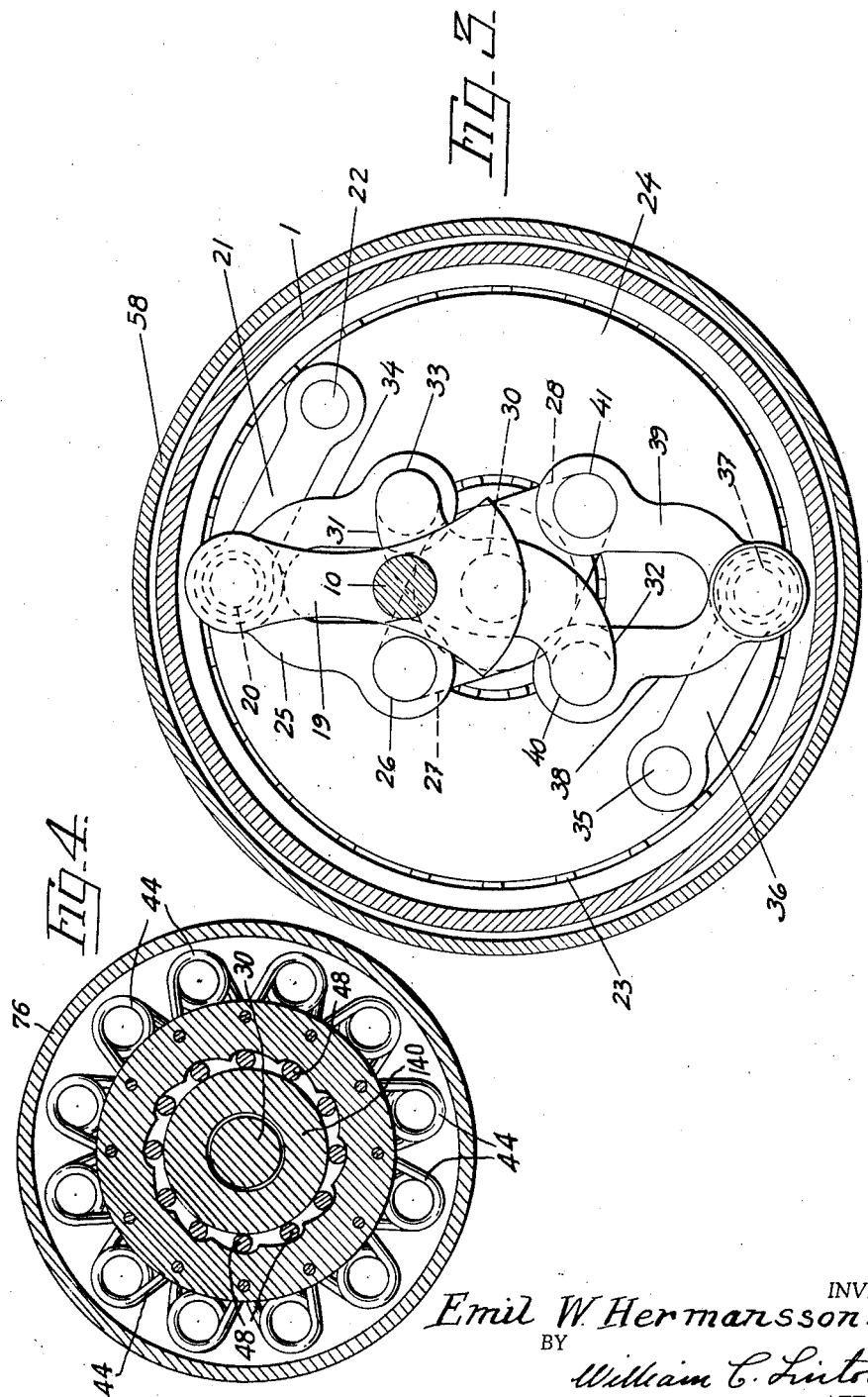

Patented Jan. 20, 1942

2,270,797

UNITED STATES PATENT OFFICE 2,270,797

VARIABLE-SPEED RATCHET GEARING

Emil Witalis Hermansson, Gothenburg, Sweden

Application December 29, 1939, Serial No. 311,655
In Sweden January 5, 1938

4 Claims. (Cl. 74—117)

This invention relates to variable-speed ratchet gearing for transmitting the movement of a rotating driving member to a rotating driven member of the kind in which the movement of the driving member is transmitted by means of a crank pin or like element of variable eccentricity and a link system connected to said crank pin, to one or more members oscillating in relation to the driving member, the movement of said oscillating members being transmitted by means of couplings which act only in one direction to the driven member so as to impart a rotating movement thereto.

The present invention is characterized in that the crank pin or the like is so actuated by members movable in relation to and participating in the rotation of the driving member and exposed to arising centrifugal forces, that said centrifugal forces will endeavour to displace the crank pin or the like away from the axis of rotation of the driving member and that the link system for the transmission of the movement of the crank pin or the like, on account of the resistance exerted by the driven member, endeavours to displace the crank pin or the like towards the axis of rotation of the driving member.

In a transmitting device of this construction the gear ratio will evidently be dependent on the driving force as well as of the resistance exerted by the driven member.

As applied to motor cars a transmitting device of this construction will involve many advantages of which the following may be mentioned.

Changes in the gear ratio will take place continuously and the gear ratio will adjust itself entirely automatically with respect to the output of the motor, as well as to the actual demand of power. The regulation of speed takes place entirely by throttling the gas. Furthermore the transmitting device saves fuel, as the motor need not be so powerful as hitherto. Finally, there will be no need for friction couplings.

In the accompanying drawings an embodiment of the invention is shown, whereby Figure 1 is a longitudinal section through a power transmitting device according to the invention, while Figures 2, 3, 4 and 5 are cross sections through the device along the lines II—II, III—III, IV—IV and V—V respectively in Figure 1.

Referring to the drawings, a cylindrical housing 1 is fixed to the end of the driving shaft 2 and within said housing there are fixed, by means of bolts 3, two discs 4, 5 disposed perpendicularly to the longitudinal direction of the driving shaft and at a distance from each other. In these discs is disposed by means of ball bearings 6, 7 a short rotatory shaft 8 eccentrically disposed in relation to the driving shaft 2, said shaft 8 being provided outside the disc 5, with a counter-balanced crank web 9 carrying a crank pin 10. On two short shafts 11, 12 disposed parallel to the shaft 8 and carried by the discs 4, 5 there are rotatorily mounted between the discs 4, 5 toothed segments 13 and 14, these toothed segments 13, 14 being each rigidly connected to a weight 15 and 16, respectively, disposed eccentrically in relation to the respective shafts 11 and 12. To the shaft 8 of the crank web 9 there is fixed a toothed wheel 17, which meshes with the toothed segments 13, 14 in such a manner that, when the driving shaft 2 rotates, the centrifugal forces, acting on the weights 15, 16 endeavour to keep the toothed wheel 17 and the crank pin 10 in the position shown in Figures 1 and 2, in which the crank pin 10 occupies its most remote position from the centre of the driving shaft. By means of mechanisms hereinafter described in detail the circular movement described by the crank pin 10 when the driving shaft rotates is used for transmitting the movement of the driving shaft to the driven shaft 18 rotatorily mounted in alignment with the driving shaft, whereby the gear ratio will depend on the distance between the crank pin 10 and the centre of the driving shaft. By turning the shaft 8 in its bearings 6, 7 against the action of the centrifugal forces acting on the weights 15, 16 this distance may evidently be diminished to a value equal to the difference between the eccentricity of the crank pin 10 in relation to the shaft 8 and the eccentricity of said shaft 8 in relation to the centre of the driving shaft. According to the embodiment shown in the drawings these eccentricities are of equal magnitude.

To the crank pin 10 there is connected one end of a counter-balanced link 19, and to a pin 21 formed on the other end of the link 19 there is connected one end of another link 21. The other end of link 21 is connected by means of a pin 22, to a disc-shaped ring 24, which is rotatorily mounted in a ball bearing 23 at the end of the housing 1 opposite to the driving shaft 2. By means of mechanisms hereinafter described said ring 24 is caused by the driven shaft 18 to rotate with a somewhat reduced angular velocity in the same direction as the driving shaft 2. To the pin 20 of link 19 there is also connected the one end of an arched link 25, the other end of which is connected by means of a pin 26 to one arm 27, of a pair of arms 27, 28 disposed diametrically opposite each other and projecting radially from one end of a sleeve 29, which latter projects out of the housing 1 through the opening of the disc-shaped ring 24. Within the said sleeve 29 there is rotatorily mounted a shaft 30, from the inner end of which, situated within the housing 1, two arms 31, 32 project in diametrically opposite directions. To the arm 31 is connected by means of a pin 33 one end of an arched link 34, the other end of which is also connected to the pin 20 of link 19. In order to counterbalance the mechanism described a pin 35 is fixed at a point of the disc-shaped ring 24 diametrically opposite the pin 22, to which pin 35 is connected one end of a link 36 corresponding to the link 21, a pin 37 being fixed to the other end of said link 36. To said pin 37 there are connected the ends of two arched links 38 and 39, corresponding to the links 25, 34, said links 38, 39 being also connected to the aforesaid arms 32 and 28 by means of pins 40 and 41, respectively.

It will be evident that when the driving shaft 2 rotates the crank pin 10 will impart by means of the links 19, 25, 34 to the sleeve 29 and the shaft 30 an oscillating turning movement in mutually opposite directions provided the disc-shaped ring 24 is moving with a less angular velocity than the driving shaft.

To the end of the sleeve 29 projecting out of the housing 1 there is fixed a ring 140 forming the inner member of a clutch which acts in one direction only, and to the end of the shaft 30 projecting out of the sleeve 29 there is fixed a ring 141 forming the inner member of a clutch which also acts in one direction only. Said clutches have a common sleeve-like outer member, 42, which is connected by means of a series of springs 44 to a flange 45 keyed to the driven shaft. The series of rollers 48 and 49, respectively, between the rings 140 and 141 and the sleeve 42 transmit the oscillating turning movement of the sleeve 29 and the shaft 30 only in the one direction, so that to the sleeve 42 and consequently—by means of the springs 44 and the flange 45—the driven shaft 18 will be imparted a rotating movement.

On a ring 57, which is rigidly connected to a fixed housing 58 embracing the several parts of the device, there is rotatorily mounted a ring 60, between which and said ring 57 there is positioned a set of coupling rollers 61 acting only in one direction. Each of two shafts 70 disposed opposite each other and carried by the ring 60 carries a double toothed wheel 71 the larger set of teeth 72 of which meshes with a toothed wheel 73 fixed to the driven shaft 18 and the smaller set of teeth 74 of which meshes with a set of teeth formed at the one end of a socket 76, which is rotatorily mounted on the shaft 18 by means of a ball bearing 75 and embraces the first-mentioned clutches 48, 49 the spring system 44 and the flange 45. The other end of said socket 75 is rigidly connected to the above-named disc-shaped ring 24, which consequently as already mentioned, will rotate with the driven shaft 18 but with a reduced angular velocity.

The device described works as follows:

When the driving shaft 2 rotates the crank pin 10 will, as already mentioned, by means of the link system 19, 25, 34, 36, 38, 39 impart to the shaft 30 and the sleeve 29 an oscillating turning movement in relation to the driving shaft and in opposite directions in relation to one another, which movement by means of the clutches 48, 49 (acting only in one direction), the sleeve 29, the spring system 44 and the flange 45 is transmitted as a substantially continuous rotating movement to the driven shaft 18. In consequence of the resistance offered by the driven shaft, the crank pin 10 owing to the action of the centrifugal forces acting on the weights 15, 16 will occupy a greater or lesser distance from the centre of the driving shaft 2 in such a manner that the eccentricity of the crank pin 10 in relation to the driving shaft 2 will diminish when the resistance of the driven shaft increases. As the size of the oscillating movements of the sleeve 29 and the shaft 30 is dependent on the size of the eccentricity of the crank pin 10, it will be evident, that the gear ratio between the driving shaft and the driven shaft will diminish when the resistance of the driven shaft increases. On the other hand, the weights 15, 16, influenced by the centrifugal forces, endeavour to increase the eccentricity of the crank pin 10 in relation to the driving shaft, so that when the number of revolutions per unit of time (i. e. angular velocity) of the driving shaft and consequently the centrifugal forces increase, the gear ratio will automatically increase. Consequently, it is possible to design the power transmitting device according to the invention for a specific purpose, e. g. for use on a motor car, in such a manner that four different conditions of speed, inclination of road and so on, the most suitable gear ratio is obtained automatically. When the crank pin 10 has occupied its most remote position from the centre of the driving shaft an increase of the angular velocity of the driving shaft or a reduction of the resistance offered by the driven shaft will permit the centrifugal forces acting on the links 23, 34, 38, 39 to prevent the link system from working as described keeping the links immovable in relation to the crank pin 10, whereby the disc-shaped ring 24 will be caused to rotate by means of the links 21, 36 with the crank pin 10 with the same angular velocity as the driving shaft, the disc-shaped ring 24 being unhindered to do so, because of the fact that the brake 61 acts unidirectionally. In this position of the parts of the device the driven shaft 18 is rotated with the same angular velocity as the driving shaft 2, giving the equivalent of direct coupling. Because of the fact that the couplings 48, 49 act unidirectionally the driven shaft 18 may rotate with greater angular velocity than the driving shaft 2, e. g. if the motor is thrown out of operation, thus providing a so-called free-wheel-coupling.

What I claim is:

1. A variable-speed ratchet gearing comprising in combination a rotating driving member, a rotatory driven member, a crank pin rotating with the driving member, a link system adapted to transmit the rotation of the crank pin to oscillating members, unidirectionally acting clutches for transmitting the movement of said oscillating members to the driven member so as to impart a rotating member thereto, said link system being connected to an element rotatably mounted coaxially to the centre of rotation of the crank pin, and the last-mentioned rotatably mounted member being caused by the driven shaft by means of a toothed wheel gearing, to rotate with a reduced angular velocity.

2. In a variable-speed ratchet gearing the combination of a rotating driving member, a rotatory driven member, a crank pin rotating with the driving member, a link system adapted to transmit the rotation of the crank pin to oscillating members, unidirectionally acting clutches for transmitting the movement of said oscillating members to the driven member so as to impart a rotating member thereto, said link system comprising on the one hand a link, one end of which is connected to the crank pin and the other end of which is connected by means of a link to an element rotatably mounted co-axially to the centre of rotation of the crank pin and by means of a toothed wheel gearing driven by the driven member with a reduced angular velocity, and on the other hand a number of links connected at their one end to the joint connecting the two first-mentioned links and at their other ends to two rotatably mounted members which are connected to one member of each of said clutches.

3. In a variable-speed ratchet gearing the combination of a rotating driving member, a rotatory driven member, a crank pin rotating with the driving member, a link system adapted to transmit the rotation of the crank pin to oscillating members, unidirectionally acting clutches for transmitting the movement of said oscillating members to the driven member so as to impart a rotating member thereto, said link system comprising on the one hand a link, one end of which is connected to the crank pin and the other end of which is connected by means of a link to an element rotatably mounted co-axially to the centre of rotation of the crank pin and by means of a toothed wheel gearing and a unidirectional detent driven by the driven member with a reduced angular velocity, and on the other hand a number of links connected at their one end to the joint connecting the two first-mentioned links and at their other ends to two rotatably mounted members which are connected to one member of each of said clutches.

4. In a variable-speed ratchet gearing the combination of a rotating driving member, a rotatory driven member, a crank pin rotating with the driving member, a link system adapted to transmit the rotation of the crank pin to oscillating members, unidirectionally acting clutches for transmitting the movement of said oscillating members to the driven member so as to impart a rotating motion thereto, said link system being connected to an element rotatably mounted co-axially to the centre of rotation of the crank pin and driven by the driven member with a reduced angular velocity, and said link system being so designed that at a certain relation between the angular velocity of the element rotated by the driven member and the resistance offered by the driven member the centrifugal forces acting on the link system keep the link system immovable in relation to the crank pin, whereby the driving member by means of the crank pin, the said link system and the unidirectional clutches rotates the driven member with the same angular velocity as the driving member.

EMIL WITALIS HERMANSSON.